United States Patent

[11] 3,612,205

[72] Inventor George M. Barrett, R.R. #5
    Galt, Ontario, Canada
[21] Appl. No. 819,155
[22] Filed Apr. 15, 1969
[45] Patented Oct. 12, 1971

[54] FLUID MOTOR
    7 Claims, 5 Drawing Figs.
[52] U.S. Cl. .................................................. 180/66 F,
                                                91/492, 91/498
[51] Int. Cl. .................................................. B60k 7/00
[50] Field of Search .......................................... 180/66 F,
            44 F, 44 M, 55, 67; 91/205, 204, 176, 491, 492,
                                498, 472; 92/DIG. 2; 60/53 B

[56]                References Cited
                UNITED STATES PATENTS
1,642,103  9/1927  Daubenmeyer .............. 10/66 F 3,090,361  5/1963  Orshansky, Jr. ............... 180/66 F UX
3,122,971  3/1964  Russell ........................... 91/205
3,464,316  9/1964  Orloff ............................ 91/205 X
                FOREIGN PATENTS
1,347,220  11/1963  France .......................... 91/176

Primary Examiner—Benjamin Hersh
Assistant Examiner—Milton L. Smith
Attorney—Diller, Brown, Ramik & Holt ABSTRACT: A fluid motor which is particularly constructed for mounting a driven member substantially concentric thereto with the driven member being preferably in the form of a vehicle wheel although the motor can drive other elements such as pulleys, shafts, etc. One of the principal features of the fluid motor is the arrangement of the components thereof, the use of fluid bearings throughout, and fluid thrust bearings particularly adapted to accommodate axial thrusts, such as those imposed by a vehicle wheel.

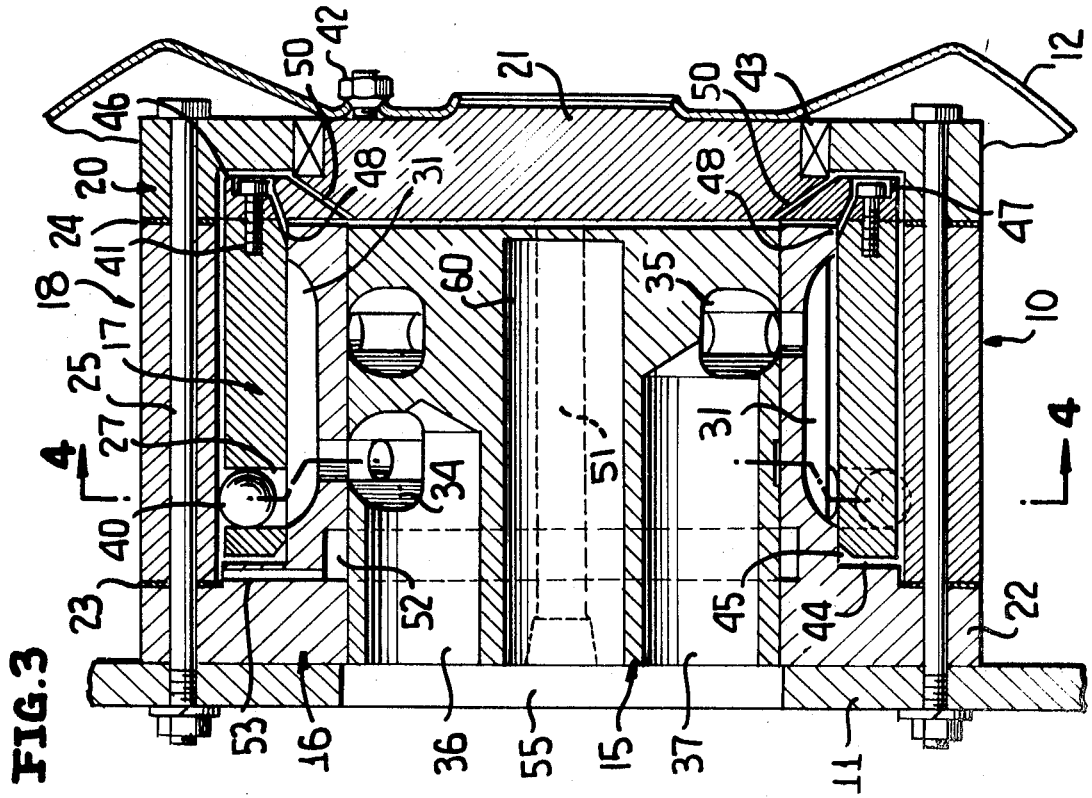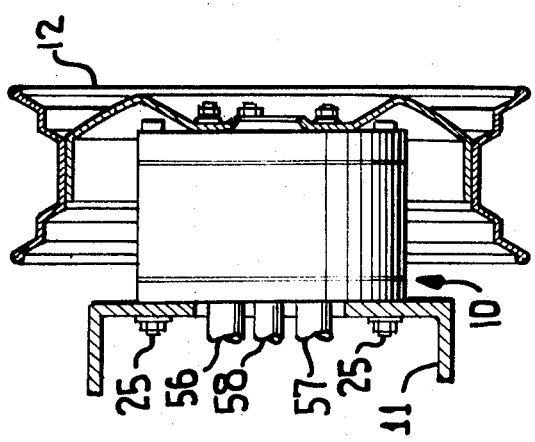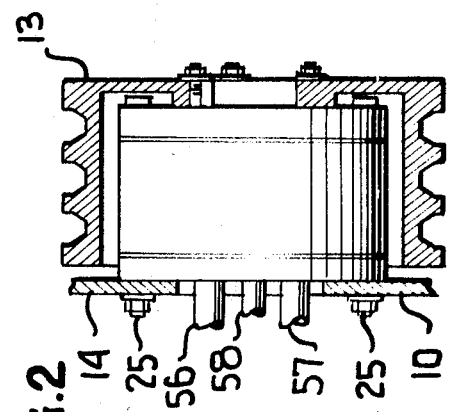

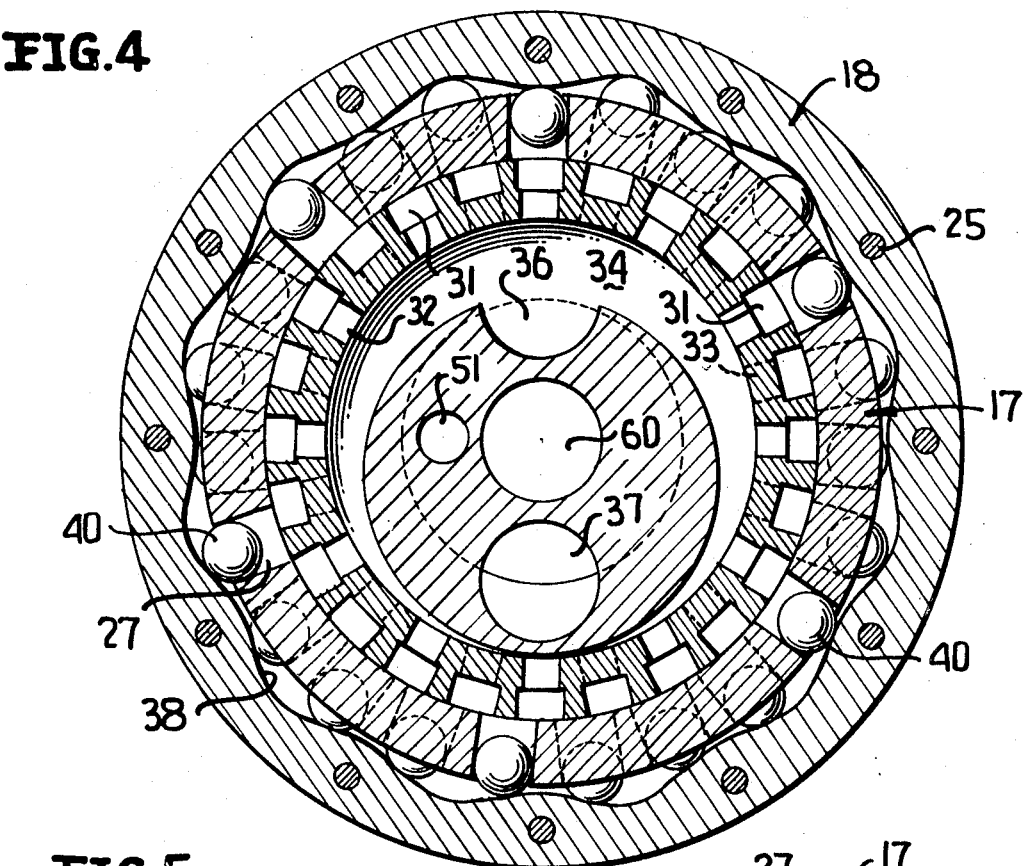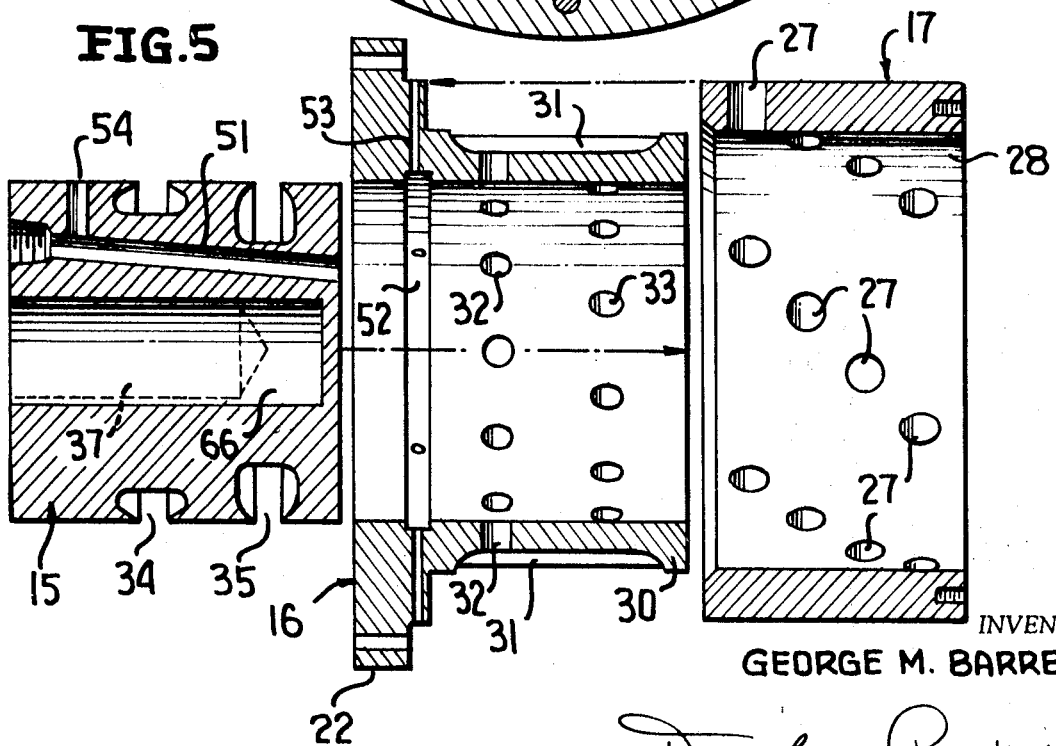

FLUID MOTOR

This invention relates in general to new and useful improvements in fluid motors, and more particularly to a fluid motor which is of a compact construction and which is adapted to be fixedly mounted at one end thereof and have a rotating component secured to the other end thereof, preferably with the rotating member being disposed concentric to the fluid motor.

This invention particularly relates to a hydraulic motor which is suitable for use both in supporting and driving a vehicle wheel. The motor is of a compact construction whereby it may be positioned within the confines of a wheel so that the wheel is disposed concentric to the motor although it is secured thereto in the normal manner at one end of the motor. The utilization of the motor for the supporting and driving of a wheel is enhanced by the fact that at the end of the motor opposite from the point of attachment of the wheel thereto, the motor may be fixedly rigidly secured to a vehicle frame member with a minimum of adaptation of the vehicle.

Another important feature of the motor is that it is provided with hydrostatic bearings throughout and may readily accommodate the relatively heavy loads of a vehicle wheel utilizing only the hydraulic fluid which is supplied to the motor for driving the same for the purpose of effecting the hydrostatic bearings.

A further and very important feature of the hydraulic motor is the provision of hydrostatic thrust bearings at the opposite ends of the rotor thereof, the hydrostatic thrust bearings being of unequal thrust so as to compensate for the unequal axial thrusts applied to vehicle wheels when turning corners.

Yet another feature of the invention is the ready adaptability of the fluid motor to the driving of pulleys and like drive elements.

Still a further feature of the invention is the adaptability of the fluid motor to drive a shaft, the motor being of a construction wherein it may be provided with a hollow bore therethrough through which a shaft may pass.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a side elevational view of the hydraulic motor being utilized as a wheel motor.

FIG. 2 is an elevational view similar to FIG. 2 showing the hydraulic motor being utilized as a drive motor for a pulley.

FIG. 3 is an enlarged longitudinal axial sectional view taken through the wheel motor of FIG. 1 and shows the specific internal construction thereof.

FIG. 4 is a transverse vertical sectional view taken along the line 4—4 of FIG. 3.

FIG. 5 is an exploded sectional view showing the relationship of the manifold, stator and rotor of the motor.

Referring now to the drawings in detail, it will be seen that there is illustrated in FIG. 1 a fluid motor constructed in accordance with this invention, the fluid motor being generally identified by the numeral 10. The illustrated use of the fluid motor 10 is that of a wheel motor. The motor 10 is secured to a vehicle frame member 11 at one end thereof and has a conventional type of vehicle wheel 12 secured to the opposite end thereof.

The illustrated utilization of the fluid motor 10 as found in FIG. 1 is only one of numerous utilizations thereof. Reference is now made to FIG. 2 wherein the same fluid motor 10 is illustrated as supporting and driving a conventional type of pulley 13. It is to be noted that the pulley 13 is secured to the fluid motor 10 in substantially the same manner as is the wheel 12 with the pulley 13 surrounding the motor 10. The motor 10 is carried by a suitable support plate 14 in the same manner as is the motor 10 of FIG. 1 carried by the vehicle frame member 11.

The specific construction of the fluid motor 10 is illustrated in more detail in FIGS. 3, 4 and 5. It will be seen that the fluid motor 10 includes basically a manifold 15, a stator 16, a rotor 17, a race 18, a case end plate 20 and a driving plate 21. It is to be noted that the stator 16 has a radially outwardly offset inner end portion 22 which is aligned with the race 18 and the radially outer portion of the end plate 20 and the stator 16 combines with the race 18 and the end plate 20 to define the case of the hydraulic motor 10. The stator 16 is sealed relative to the inner end of the race 18 preferably by means of a gasket 23 while the outer end of the race 18 is sealed relative to the end plate 20 preferably by means of a gasket 24. Through bolts 25 secure together the end plate 20, the race 18 and the stator 16 as is clearly shown in FIG. 3.

Referring now to FIGS. 4 and 5 in particular, it will be seen that the rotor 17 is provided with a plurality of radially extending cylinders 27. The cylinders 27 are arranged in a plurality of rows with the cylinders of adjacent rows being preferably offset circumferentially. At this time it is pointed out that while four rows of cylinders 27 have been illustrated, the number of rows may vary and it is possible that the motor may have only one row of cylinders.

It is to be noted that the rotor 17 has a cylindrical bore 28 which is of a diameter to receive the stator 16 with a very small, predetermined clearance therebetween. Thus, the rotor 17, in effect, directly rotates on the stator with there being a hydrostatic bearing between the rotor 17 and the stator 16.

It is to be noted that the stator 16 includes an annular body portion 30. As indicated above, the body portion 30 is of a diameter to be received within the rotor 17. The body portion 30 has formed in the peripheral surface thereof a plurality of axially extending fluid ports 31 with the axial extent of the fluid ports 31 being such so that they will communicate with all of the rows of the cylinders 37. The stator body 30 is also provided with two rows of radial ports 32 and 33. The ports 32 and 33 are disposed in alternating relation, as is shown in FIGS. 4 and 5, and are communicated with alternate ports 31 at the opposite ends thereof.

The manifold 15 tightly fits within the stator 16 and may be secured thereto in any desired manner. However, the simplest is to provide a substantially press fit between the manifold 15 and the stator 16 and, if necessary, to utilize an adhesive between the two.

The manifold 15 has two annular passages 34 and 35 which are axially aligned with the ports 32 and 33, respectively. As is best shown in FIG. 3, an axially extending primary passage 36 is communication with the passage 34 and an axially extending primary passage 37 is in communication with the passage 35. The passages 36 and 37 will be inlet and discharge passages depending upon the direction of rotation of the rotor 17.

Referring now to FIG. 4 in particular, it will be seen that the race 18 has an inner race surface 38 which is of a multiple lobe configuration and wherein the number of lobes and position of lobes corresponds to the number and position of the ports 31. It is also to be noted that the number of cylinders 27 in each row of cylinders should be a number other than the number of ports 31 and lobes of the racetrack 38.

It will be readily apparent that due to the large number of cylinders and the associated pistons, which pistons are identified by the numeral 40, as well as the large number of lobes of the racetrack 38, the hydraulic motor 10 will have a high output torque. Of course, if one is interested more in speed than torque, then the number of racetrack lobes may be diminished, together with a like diminishing of the number of ports 31.

At this time it is pointed out that although the pistons 40 have been illustrated as in the form of balls, the invention is not so restricted to such pistons. It will, however, be apparent that balls are the cheapest form of piston.

Referring once again to FIG. 3 in particular, it will be seen that the rotor 17 is coupled to the driving plate 21 by a plurality of circumferentially spaced fasteners 41. The driving plate 21, in turn, is provided with suitable lug bolts 42 for the mounting of the wheel 12 or other element to be driven by the motor 10.

The inner end of the motor 10 is sealed due to the sealed construction of the case and the sealed relationship between the manifold 15 and the stator 16. While the driving plate 21 is free to rotate within the end plate 20, it will be seen that a seal 43 is carried by the end plate 20 with the seal riding on a peripheral portion of the driving plate 21 so as to seal the outer end of the motor 10.

In view of the fact that the rotor 17 is always spaced from the race 18, it will be seen that the only rotary bearing is the one which exists between the rotor 17 and the stator 16. As previously mentioned, this rotary bearing is a hydrostatic bearing with the hydrostatic bearing being effected by a slight leakage of the hydraulic fluid under pressure out of the ports 31. It is to be understood, however, that the hydrostatic bearing is of sufficient size and the pressure of the fluid thereof is sufficiently high so as to support any load which may be imposed upon the motor 10 in the normal usage thereof.

In addition to the rotary hydrostatic bearing mentioned above, the motor 10 also includes an inner and an outer hydrostatic bearing. The inner hydrostatic bearing is at 44 and is between the inner end of the rotor 17 and the projecting portion 22 of the stator 16. It is to be understood that the illustrated spacing between the rotor 17 and the portion 22 is exaggerated and that the hydrostatic thrust bearing 44 is relatively thin in section. This minimizes the escape of the hydraulic fluid under pressure radially around to the outer surface of the race 17. On the other hand, in order to obtain a maximum outwardly directed axial thrust on the rotor 17, the rotor 17 is chamfered as at 45 to provide a thrust face thereon through which hydraulic fluid under pressure is readily accessible.

An outer hydrostatic thrust bearing is provided as at 46 between the outer end of the rotor 17 and the end plate 20. Once again, the spacing is exaggerated and the thickness of the hydrostatic thrust bearing 46 is minimal. In order to assure the existence of hydraulic fluid under pressure in the hydrostatic thrust bearing 46, an annular groove 47 is formed in the face of the driving plate 21. Incidentally, the head of the fasteners 41 are recessed in the groove 47. The groove 47 is in communication with the hydrostatic bearing between the race 18 and the stator 16 by means of several passages 48. It is to be noted that the passages 48 extend through the rotor 17 and into and through the driving plate 21.

It is to be noted here that when the motor 10 is utilized as a wheel motor, during the usage thereof, the thrust of the wheel 12 in an axial direction on the rotor 17 during the turning of the vehicle of which the wheel 12 is a part is always axially inwardly. This is because higher pressures are always placed on the outboard wheels and the vehicle has a tendency to move outwardly beyond the wheels. As a result, it is normally desired in a wheel motor that the pressure of the hydrostatic thrust bearing 44 to be greatly in excess of that of the hydrostatic thrust bearing 46.

The pressure exerted by the hydrostatic thrust bearing 46 of the rotor 17 is controlled in two ways. First, by restricting the number and sizes of the passages 48. Secondly, the hydrostatic thrust bearing 46 has coupled thereto suitable drain passages 50. The drain passages 50 drain down into the space between the end of the manifold 15 and the inner face of the driving plate 21 and is drained off through a drain line 51 which is clearly shown in FIG. 5.

In certain instances, it may be desirable to provide a drain for the hydrostatic thrust bearing 44. Accordingly, the stator 16 is illustrated as having formed in the inner surface thereof an annular drain passage 52 which has coupled thereto a small number of radiating drain passages 53 which open into the space between the rotor 17 and the race 18. Should the drain passages 52 and 53 not be desired, or should the flow therethrough be desirably restricted, either they may be omitted, or the drain passages 53 may be suitably plugged.

Referring once again to FIG. 5 in particular, it will be seen that the manifold 15 is provided with a drain passage 54 which extends radially outwardly from the drain passage 51 formed therein. The drain passage 54 opens into the annular drain passage 52 of the stator to receive drainage therefrom.

It will be readily apparent from FIGS. 1 and 3 that the mounting of the motor 10 is easily facilitated. It is merely necessary to provide a suitable supporting member, such as the vehicle frame member 11, and to pass the through bolts 25 therethrough so as to simultaneously secure together the elements of the motor 10 and to mount the motor 10. Of course, if it is desired to not utilize the through bolts 25, the ends thereof may be recessed in the portion 22 of the stator 16 and separate fasteners passed through the frame member 11 into the stator 16.

It is also to be noted that the frame member 11 must have a large opening 55 therein generally centrally aligned with respect to the motor 10. The opening 55 is provided for the purpose of permitting the passage through the frame member 11 of fluid lines 56 and 57 which are coupled to the passages 36 and 37, respectively. The drain return line 58 also passes through the opening 55 and is coupled to the drain line 51.

It will be readily apparent that the motor 10, either when carrying a wheel 12 or a pulley 13, is provided with proper hydrostatic bearings, both radial and thrust, for the free rotation of the rotor 17 under all normal operating conditions. Furthermore, it will be readily apparent that the hydrostatic bearings are formed from the hydraulic fluid which is directed into the motor 10 for the purpose of operating the same. Therefore, the hydrostatic bearings are built in and require no special attention.

Although the motor 10 normally may be broadly considered as a wheel motor, it is to be understood that it is not so limited in usage. For example, the motor 10 may be readily coupled to a shaft by providing a through hole or bore. The manifold 15 is illustrated as being provided with a partial bore 60 in which a shaft may be snugly received. The manifold 15 may be provided with a blanked off bore, such as the bore 60, or may be provided with a special bore when it is to receive a shaft. It is to be understood that such a shaft will freely pass through the manifold 15 and must be sealed relative thereto to prevent the loss of hydraulic fluid through the bore 60 from between the manifold 15 and the driving plate 21.

It is also to be understood that when the motor 10 is to be utilized in the driving of a through shaft, it will be necessary to specifically configurate the driving plate 21. At least the driving plate 21 will require an opening (not shown) therethrough. Then the driving plate 21 must be provided with suitable means for coupling a shaft thereto. If the shaft is provided with a flange, it may be secured to the driving plate 21 utilizing the lugs 42 or similar fasteners. On the other hand, the opening through the driving plate 21 may be internally splined, etc.

It will be readily apparent form the foregoing that the principal features of the hydraulic motor 10 is the compactness of construction and the hydrostatic bearings thereof, particularly the hydrostatic thrust bearings. It will be readily apparent that due to the compaction of the construction and the provision of the hydrostatic thrust bearings, the motor 10 may be utilized both for the mounting of and driving machine elements, including wheels, pulleys, shafts, etc.

Although only a preferred embodiment of the hydraulic motor has been specifically illustrated and described, it is to be understood that minor variations may be made therein without departing from the spirit of the invention.

I claim:

1. A fluid motor, said fluid motor being of a construction particularly to be fixedly secured to a support at an inner end and have a concentrically disposed driven member coupled to an outer end, said motor including a stator and a case adapted to be fixedly mounted, a rotor mounted within said case and supported by said stator for rotation about said stator, said rotor having a plurality of radiating cylinders formed therein with each cylinder having a piston disposed therein, said case including a race member having an internal raceway engageable by said pistons and cooperating therewith to effect rotation of said rotor, and a drive plate coupled to said rotor at one end thereof for rotation therewith and for cooperation with said case to seal said motor at said outer end, said drive plate being primarily disposed within said case and having means thereof for mounting a wheel and like members.

2. The fluid motor of claim 1 wherein said rotor has fluid thrust bearings at the opposite ends thereof to compensate for axial thrusts thereon, and said fluid motor is particularly adapted to have a wheel carried thereby and the fluid thrust at the inner end of said rotor is greater than the fluid thrust at the outer end of said rotor to compensate for axial thrust during the turning of a vehicle of which said hydraulic motor is to be a part.

3. The fluid motor of claim 2 wherein said fluid thrust differential is at least in part effected by venting the case at the outer end of said rotor.

4. The fluid motor of claim 2 wherein said fluid thrust differential is at least in part effected by providing a special thrust surface at the inner end of said rotor adjacent said stator.

5. The fluid motor of claim 1 wherein all bearings of said motor are fluid bearings, and said rotor has fluid thrust bearings at the opposite ends thereof to compensate for axial thrusts thereon, fluid under pressure from said fluid bearing between said rotor and said stator escaping axially to the ends of said rotor and forming said fluid thrust bearings, and said fluid motor is particularly adapted to have a wheel carried thereby and the fluid thrust at the inner end of said rotor is greater than the fluid thrust at the outer end of said rotor to compensate for axial thrust during the turning of a vehicle of which said hydraulic motor is to be a part.

6. The fluid motor of claim 1 wherein said case includes an outer end plate, said stator, said race member and said end plate all having aligned and joined together outer peripheral portions cooperating to encase said rotor.

7. The fluid motor of claim 1 wherein a fluid flow control manifold is positioned entirely within said stator and is coupled thereto for delivering fluid to and removing fluid from said stator.